United States Patent
Rao et al.

(10) Patent No.: US 12,032,806 B2
(45) Date of Patent: Jul. 9, 2024

(54) N-COLUMN EXPLORER

(71) Applicant: SAP SE, Walldorf (DE)

(72) Inventors: Santhosh Rao, Bangalore (IN);
Rajarshi Ghosh, Mannheim (DE);
Roseline Toppo, Bangalore (IN);
Akshay Chauhan, Bangalore (IN);
Devesh Kumar Dhiman, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/324,590

(22) Filed: May 19, 2021

(65) Prior Publication Data

US 2022/0374108 A1 Nov. 24, 2022

(51) Int. Cl.
| | |
|---|---|
| G06F 3/048 | (2013.01) |
| G06F 3/0482 | (2013.01) |
| G06F 3/04845 | (2022.01) |
| G06F 8/70 | (2018.01) |
| G06F 16/22 | (2019.01) |
| G06F 16/28 | (2019.01) |

(52) U.S. Cl.
CPC ........ *G06F 3/0482* (2013.01); *G06F 3/04845* (2013.01); *G06F 8/70* (2013.01); *G06F 16/221* (2019.01); *G06F 16/282* (2019.01)

(58) Field of Classification Search
CPC .. G06F 3/0482; G06F 3/04845; G06F 16/221; G06F 16/282
See application file for complete search history.

(56) References Cited

U.S. PATENT DOCUMENTS

| | | | |
|---|---|---|---|
| 5,787,411 A | 7/1998 | Groff et al. | |
| 6,484,190 B1 * | 11/2002 | Cordes | G06F 16/9027 |
| | | | 715/205 |
| 7,707,506 B2 * | 4/2010 | Weigel | G06F 16/951 |
| | | | 715/854 |
| 7,743,140 B2 | 6/2010 | Arndt et al. | |
| 8,001,487 B2 * | 8/2011 | Koppert | G06F 3/04855 |
| | | | 715/833 |
| 8,112,461 B2 | 2/2012 | Wykes et al. | |

(Continued)

OTHER PUBLICATIONS

Google Flights: Task flow and Design patterns, by Maggie Li, May 6, 2019 (Year: 2019).*

(Continued)

*Primary Examiner* — Mahelet Shiberou
(74) *Attorney, Agent, or Firm* — Fish & Richardson P.C.

(57) ABSTRACT

The present disclosure involves system, methods, and media for displaying and exploring software object relationships in an interactive manner. In general, complex structures can have relationships between objects, such as parent/child relationships, general associations, and dependencies. Additionally, some objects may have multiple dependencies. For example, an object representing "low battery" may be a child object for both a screen failure object and a GPS failure object. The n-column explorer allows for exploring relationships between objects of arbitrary categories and in hierarchies of arbitrary depth, without the need to duplicate objects. For example, the "low battery" object need not be duplicated for both the GPS failure and the screen failure.

19 Claims, 7 Drawing Sheets

(56) References Cited

U.S. PATENT DOCUMENTS

| | | | |
|---|---|---|---|
| 8,677,279 B2* | 3/2014 | Gan | G06F 16/904 |
| | | | 715/764 |
| 8,818,992 B2* | 8/2014 | Punaganti Venkata | |
| | | | G06F 16/24578 |
| | | | 707/769 |
| 9,009,171 B1 | 4/2015 | Grossman et al. | |
| 9,037,997 B2* | 5/2015 | Ording | G06F 3/0484 |
| | | | 715/790 |
| 9,501,849 B2 | 11/2016 | Wong et al. | |
| 9,542,478 B2 | 1/2017 | Eide et al. | |
| 10,409,832 B2 | 9/2019 | Rao et al. | |
| 2005/0027797 A1* | 2/2005 | San Andres | G06F 11/201 |
| | | | 714/E11.097 |
| 2007/0185894 A1* | 8/2007 | Swain | G06F 16/26 |
| | | | 707/999.102 |
| 2009/0313268 A1 | 12/2009 | Folting et al. | |
| 2009/0319956 A1* | 12/2009 | Emard | G06F 16/904 |
| | | | 715/854 |
| 2012/0019561 A1* | 1/2012 | Lection | G06F 3/167 |
| | | | 345/635 |
| 2014/0280363 A1* | 9/2014 | Heng | G06F 16/185 |
| | | | 707/802 |
| 2014/0316956 A1* | 10/2014 | Loewen | G06Q 30/04 |
| | | | 705/34 |
| 2019/0087484 A1 | 3/2019 | Jacob et al. | |
| 2019/0295185 A1* | 9/2019 | Nabi | G06F 3/0482 |
| 2020/0249803 A1* | 8/2020 | Sobel | G06F 16/248 |
| 2020/0341606 A1* | 10/2020 | Kleinerman | G06F 3/04855 |
| 2021/0240337 A1 | 8/2021 | Fujii | |
| 2022/0350783 A1* | 11/2022 | Carlozzi | G06F 16/282 |
| 2022/0374230 A1 | 11/2022 | Rao et al. | |

OTHER PUBLICATIONS

Non-Final Office Action issued in U.S. Appl. No. 17/325,697 on Sep. 14, 2022, 27 pages.

Final Office Action in U.S. Appl. No. 17/325,697, dated Feb. 24, 2023, 16 pages.

Non-Final Office Action in U.S. Appl. No. 17/325,697, dated May 11, 2023, 13 pages.

Final Office Action in U.S. Appl. No. 17/325,697, mailed on Dec. 5, 2023, 14 pages.

* cited by examiner

N-COLUMN EXPLORER

BACKGROUND

Software objects often have complex relationships with each other, including forming hierarchical structures, and have multiple dependent associative properties. Databases of software objects can include thousands or more of objects, which need to be presented in a human understandable manner.

SUMMARY

The present disclosure involves system, software, and computer implemented methods for displaying and traversing software data objects that have complex associations with other data objects. The software objects can form a hierarchy or have a generally associative nature. One example implementation includes presenting a first column that includes a plurality of first software objects to a user in a graphical user interface (GUI). Each first software object is presented in the GUI with an interactive GUI element. A second column is presented adjacent to the first column in the GUI. A selection of a particular first software object is received in the GUI and the second column is populated with a plurality of second software objects distinct from the first software objects, the plurality of second software objects being child objects of the particular first software object and each second software object presented in the GUI with the interactive GUI element.

Implementations can optionally include one or more of the following features.

In some instances, the interactive GUI element includes an edit button, a bookmark button, and an unselect button.

In some instances, the interactive GUI element presents a number of child software objects associated with the software object on which it is displayed.

In some instances, a third column is presented adjacent to the second column and a selection of a particular second software object is received. The third column is populated with a plurality of third software objects distinct from the first and second software objects, the third plurality of software objects being child objects of the particular second software object, and each of the plurality of third software objects include the interactive GUI element.

In some instances, an updated selection of a particular first software object is received in the GUI and the second column is updated in the GUI to present a plurality of fourth software objects distinct from the updated selection of the particular first software object and the second plurality of software objects, the plurality of fourth software objects being child objects of the updated particular first software object.

In some instance, a breadcrumb is presented indicated all received selections.

In some instance, each of the second plurality of software objects is unique to each of the other second plurality of software objects, and at least one of the software objects in the second plurality of software objects is a child to at least a first and second of the first plurality of software objects.

In some instances, each object is associated with a priority which determines an order each object is presented in its respective column.

In some instances, the first column and the second column are columns in a plurality of columns, and the plurality of columns are arranged adjacent to each other. In these instances, the number of columns displaced is based on the available screen space.

In some instance, populating the second column includes replacing an empty column with the second column, including the second plurality of software objects.

In some instances, presenting the second column includes filtering a general plurality of software objects previously displayed in the second column to present the second plurality of software objects.

One example implementation includes presenting, in a GUI, a plurality of columns that each include a plurality of software objects. Each software object includes an attribute and at least one association with another software object. A selection of a particular software object in one of the plurality of columns is received in the GUI and the software objects in each of the other columns of the plurality of columns is populated to present software objects that are associated with the selected particular software object.

In some instance, the attribute identifies a particular column of the plurality of columns to which each software object is assigned.

In some instance, each software object is presented with an interactive GUI element. The interactive GUI element can include an edit button, a bookmark button, and an unselect button. In some instances, the interactive GUI element presents a number of associated software objects.

In some instances, the plurality of columns are arranged adjacent to each other and the number of columns displayed is based on available screen space.

In some instances, an updated selection of a second particular software object is received in the GUI and software objects in each of the other columns of the plurality of columns are updated in the GUI to present software objects that are associated with the second selected particular software object. In some instance, the second selected particular software object is in a different column then the selected particular software object.

The details of these and other aspects and embodiments of the present disclosure are set forth in the accompanying drawings and the description below. Other features, objects, and advantages of the disclosure will be apparent from the description, drawings, and claims.

DETAILED DESCRIPTION

This disclosure describes methods, software, and systems for displaying and exploring software object relationships in an interactive manner. In general, complex structures can have relationships between objects, such as parent/child relationships, general associations, and dependencies. Additionally, some objects may have multiple dependencies. For example, an object representing "low battery" may be a child object for both a screen failure object and a GPS failure object. The n-column explorer allows for exploring relationships between objects of arbitrary categories and in hierarchies of arbitrary depth, without the need to duplicate objects. For example, the "low battery" object need not be duplicated for both the GPS failure and the screen failure.

The described solution is advantageous in that it can display complex relationships between a number of diverse objects without being limited to specific categories or structures. Additionally, objects being displayed need not be duplicated to provide multiple dependencies or for multiple different associated applications. For example, in a hierarchical data structure, when two (or more) parent nodes share an identical child node, that node need not be replicated for each parent in order to display or explore the hierarchy in the n-column explorer. One example, but not the only such example, of a hierarchical structure is one where some data objects have a relationship where one object is superior in scope to another data object. A parent object may be a broad category of an item or an event and a child or children objects of that parent object may be specific items of events within the broader category of the parent object.

Figure 1:
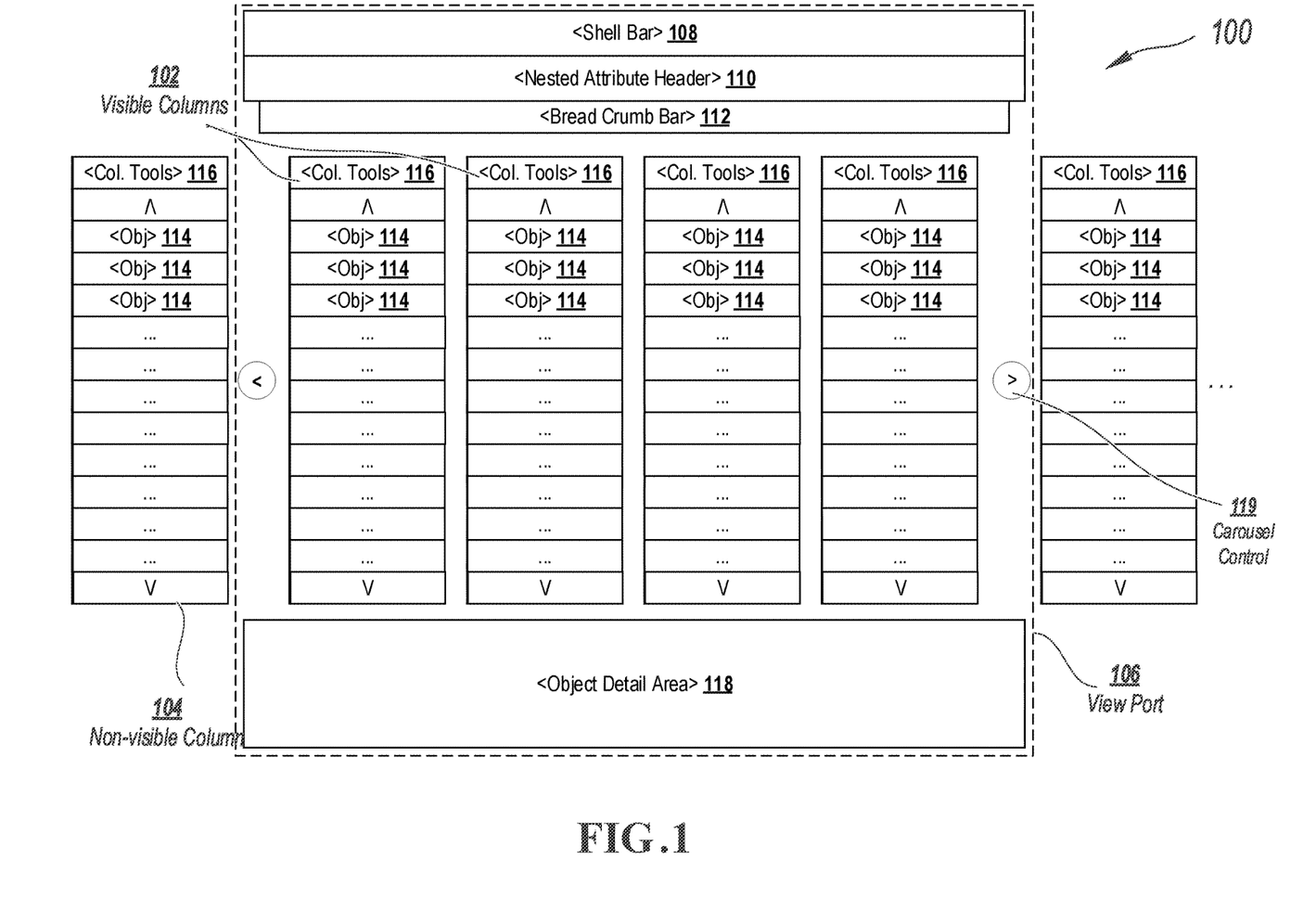
FIG. 1 is an example GUI showing an n-column explorer.

Turning to the illustrated example implementation, FIG. 1 shows an example GUI showing an n-column explorer 100. The explorer 100 includes one or more visible columns 102 and one or more non-visible columns 104, where the non-visible columns 104 exist in the data structure, but are present outside of the viewport 106 based on available display space provided by a user computing device.

A shell bar 108 can be provided in the n-column explorer 100, which can provide basic GUI elements for navigation between applications or other n-column explorers. For example, the shell bar 108 can include a home icon, back button, search bar, notification icon, minimize button, close button, or other elements.

A nested attribute header 110 can provide a title or overall description for the objects displayed in the n-column explorer 100. The nested attribute header 110 can include GUI elements, such as navigation buttons or a search bar, which specifically searches objects in the data structure associated with the nested attribute header 110. The nested attribute header 110 can further have action buttons or icons which enable global actions associated with the data structure including one or more specific data objects within the data structure (e.g., save, edit, copy, move, etc.). The nested attribute header 110 can include details related to the data structure presented in the columns below, as well. For example, the nested attribute header 110 can include a total number of objects, details associated with a selected object (e.g., location, risk assessment, price, status etc.), and actions (e.g., approve, reject, etc.), among others.

The columns 102 and 104 list data objects 114 to be selected or explored by the user. In some implementations, when the n-column explorer is displaying a hierarchical data structure, each column displays objects from a different level in the hierarchy. For example, the left-most column can show the highest tier and each column to the right displays progressively lower tiers. In some implementations, the columns are not populated with objects 114 until the column to its immediate left has an object selected. For example, initially only the first column (e.g., leftmost column) is populated. When the user selects an object 114 in that column, the column to its immediate right is populated with objects 114 that are related to (e.g., child objects) or have relations with the selected object 114. In some implementations, all of the columns are populated (e.g., with most common objects, highest priority objects, etc.), and selecting an object 114 filters the objects 114 in the downstream columns to objects associated with the selected object 114. This can be repeated as the user traverses down the data structure, selecting a data object 114 deeper within the data structure in each iteration. A breadcrumb bar 112 is provided below the nested attribute header 110. The breadcrumb bar 112 can orient the user, showing previous object selections made in prior columns.

As the user traverses the columns, the columns may be presented in a carousel or barrel fashion, where the carousel shifts the columns left or right within the viewport 106. Visible columns 102 with selections can be shifted to the left, outside of the viewport 106, and can become non-visible columns 104. GUI elements, such as arrows or buttons (e.g., carousel control 119), can be provided to allow the user to traverse the columns to move through both visible and invisible columns. In some implementations, gestures (e.g., swipes, click-and-drag, and two-finger touch, among others) can be recognized and used for moving the columns 104 and 102 left or right within the viewport 106. In some implementations, the carousel shifts columns up and down instead of, or in addition, to left and right. For example, carousel controls 119 can be provided to move all columns up or down, while separate controls (e.g., column controls, click and drag, swipe, or other gesture) is used to scroll up or down within each individual column. Additionally, the objects 114 in each column 102 can be sorted, ordered, or filtered independently of the other columns 102. Each column 102 and 104 includes a column toolbar 116. The column toolbar 116 can include buttons, menus, icons, or other interactive elements, which enable user interaction with the column. The column toolbar 116 can include, for example, a search bar which searches the column, an "add" button which allows addition of new objects, an "edit" button, a "delete" button, a "sort" button, or other GUI elements.

An object detail area 118 can provide additional details regarding the selected or focused object. This detail can be context-specific, where the detail shown is based on the focused object. For example, where the focused object represents a maintenance task, the detail area 118 can display estimated cost, time to complete the task, and/or a risk assessment, among others. In another example, where the focused object represents a mechanical system, the detail area 118 can show a component cost, supplier information, or other relevant information. In some implementations, the detail area 118 can include standardized object information for any focused object, such as an object ID number, object type, storage location, or other information regarding the focused software object.

Figure 2:
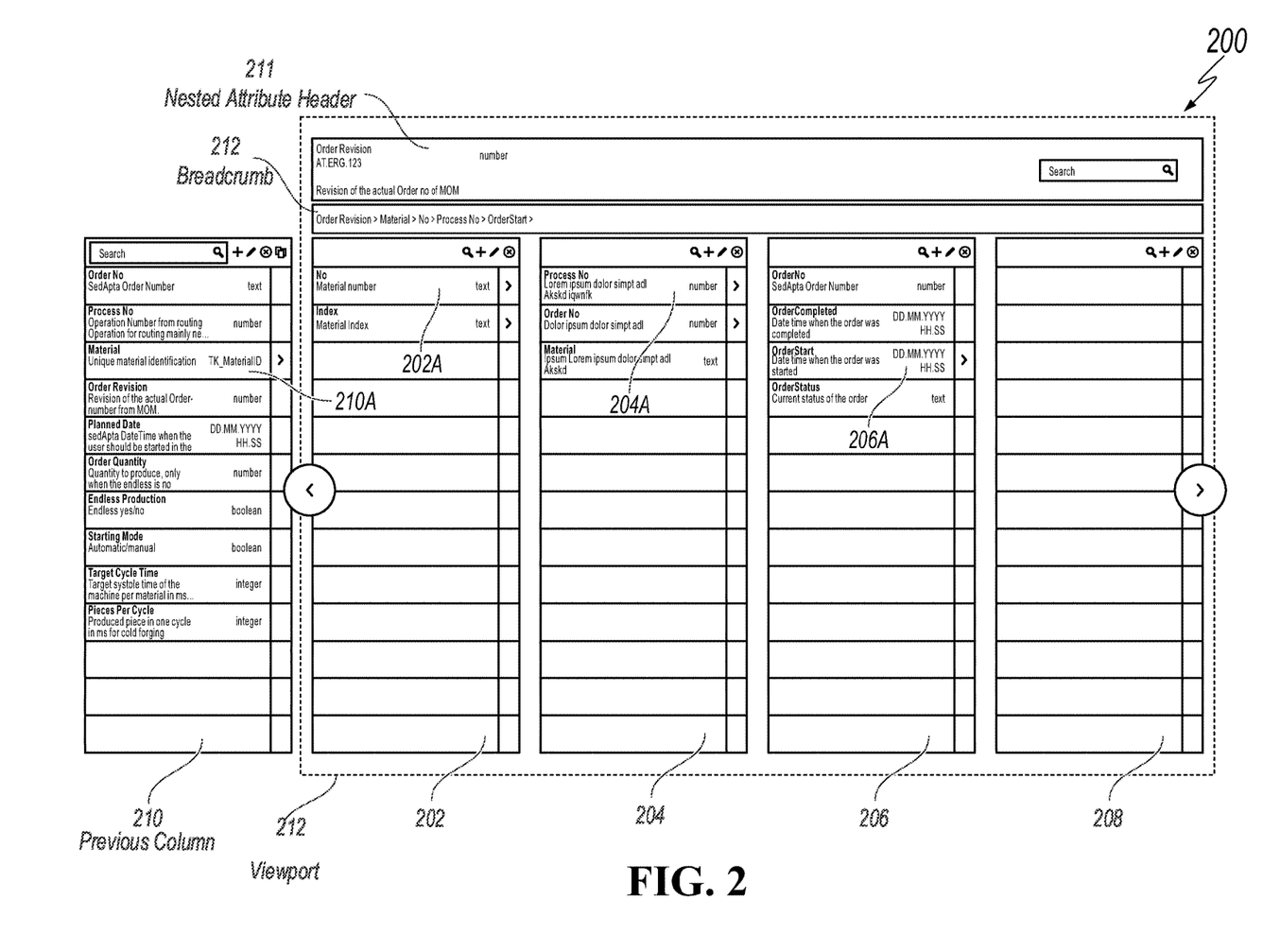
FIG. 2 is an example of an n-column explorer displaying objects in a hierarchical arrangement.

FIG. 2 illustrates an example n-column explorer 200 displaying objects in a hierarchical arrangement. In the illustrated example, the n-column explorer 200 is displaying objects in four columns 202, 204, 206, and 208, with column 210 as a non-visible column. The example hierarchical data structure is for an order revision, where the user previously traversed the hierarchy starting at order revision as indicated by the nested attribute header 211 and the breadcrumb 212, then material 210A (as shown in previous column 210 hidden from the viewport 212). The user selected the object 202A titled "No" in column 202 which populated column 204, where the user then selected object 204A "process no". In some implementations, column 204 remains blank until a selection is made (e.g., the selection of object 202A). In some implementations, column 204 may have a number of objects shown, which are not filtered or sorted until a selection in column 202 is made. As described, "populating" a column can refer to adding objects to a column (e.g., that is otherwise empty), filtering a column to present only objects related to the selection made in the previous column, or sorting a column, showing objects related to the selection made in the previous column first, with other objects below, or in a secondary position to the related objects. The selection of object 204A populates column 206, which provided the user with objects related to the "process no" object, where the user has selected the "order start" object 206A. Since the "order start" object 206A in column 206 has no child objects, column 208 is rendered as an empty column. With the "order start" object selected in column 206, the user can then interact with the object (e.g., via a detailed area similar to detail area 118 as illustrated with FIG. 1) to input necessary information and begin an order. It should be noted that while the "order start" object is a child of the "process no" object, the "order start" object can also be a child of other objects (e.g., "order no" object in column 204 or the "index" object in column 202). Thus, a single "order start" object can be represented in multiple places in the hierarchy without needing to be replicated in the underlying database storing the object. In some implementations, where the user selects a new element in a previous column, the following columns automatically update. For example, if the user were to unselect "process no" in column 204, and select "material" in column 204, then the objects in column 206 can be replaced with objects that are child objects of the "material" object in column 204. It should be noted that in the illustrated example, a shell bar (e.g., shell bar 108 of FIG. 1) is not shown for simplicity and clarity.

In some implementations, instead of filtering or sorting to show child objects, all objects remain in each column and children of a selected object are highlighted, or otherwise emphasized. For example, column 204 may include ten objects (not shown), and when object 202A is selected, the three objects that are child objects of object 202A become highlighted, bolded, moved to the top of column 204, or otherwise emphasized.

Figure 3:
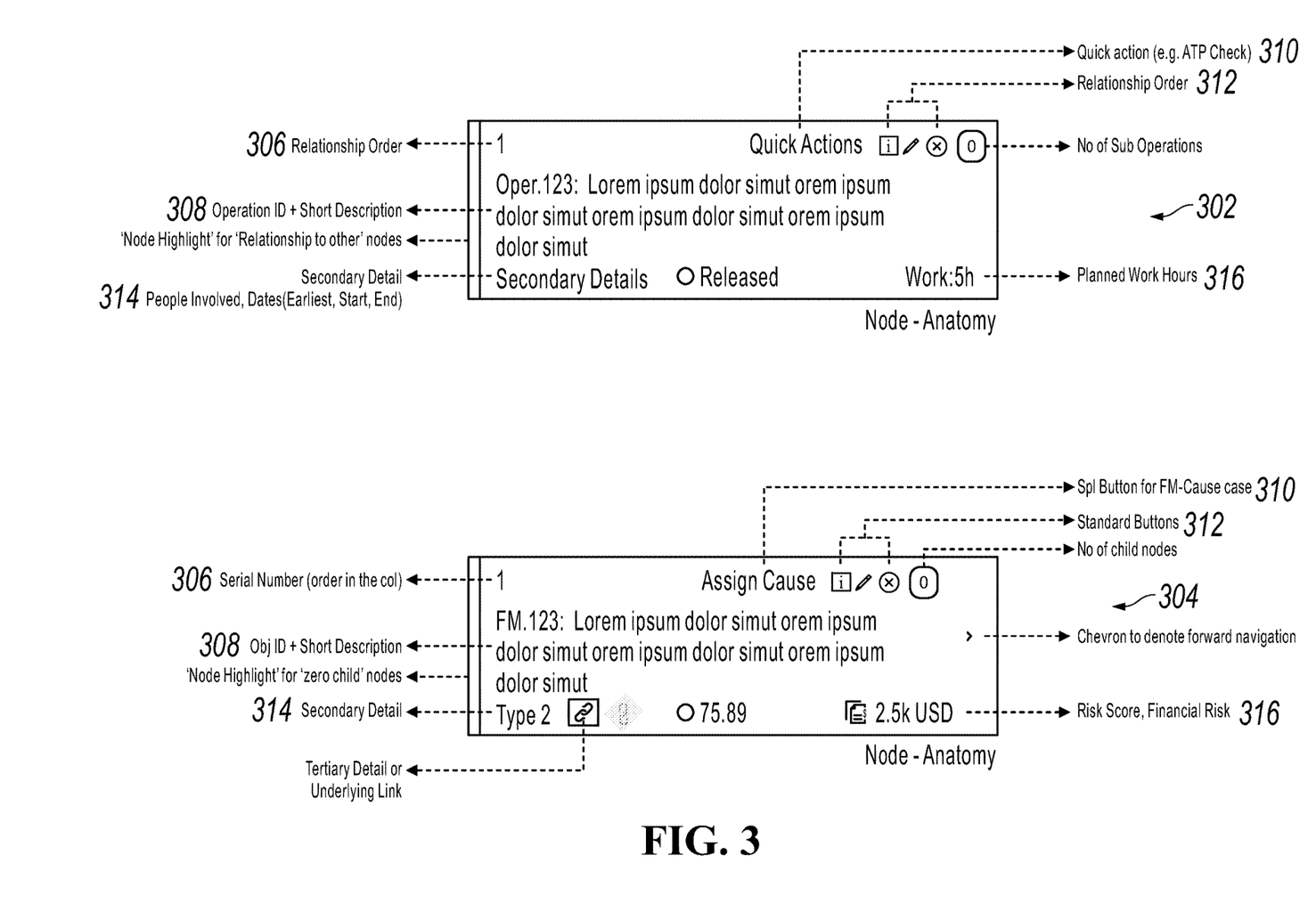
FIG. 3 illustrates example software objects to be displayed in an n-column explorer.

FIG. 3 illustrates example software objects to be displayed in an n-column explorer. Object 302 illustrates an example operations object that includes primary details 308, secondary details 314, and tertiary details 316. The primary details 308 show name information regarding the object, and the secondary details 314 can provide information regarding the operation the object 302 represents. Secondary details 314 and tertiary details 316 can be contextual or dependent on the object type, system status, user, or other criteria, as well as the particular object selected. The secondary details 314 and tertiary details 316 can include, for example, expected work hours, cost, risk assessment, failure type (where the object is a failure object), serial number or part number (where the object is represents a part), or other details. Different objects and object types may each have different details associated with them, and these illustrated details are merely an example.

Object 304 illustrates an example failure type object, where the secondary detail 314 indicates a type 2 failure and the tertiary detail 316 indicates a risk factor of 75.89 and an estimated $2,500 financial risk. Both objects 302 and 304 include quick action links 310, which can enable the user to perform one or more actions related to the object. For example, the quick action link 310 for the failure object 304 allows a user to assign a cause of the failure to the object 304. Other quick actions can include approving, denying, associating with another object, dating, or other suitable actions relevant to the particular object and object type.

One or more standard buttons 312 are included on the objects 302 and 304, and can include an edit button, delete button, dependency indicator (e.g., illustrating the number of objects that have a child relationship with the current object), info button, search bar, or other suitable button. In some implementations, the standard buttons 312 are present on all objects in the n-column explorer, while in others, only a subset of the objects include such buttons 312.

Figure 4:
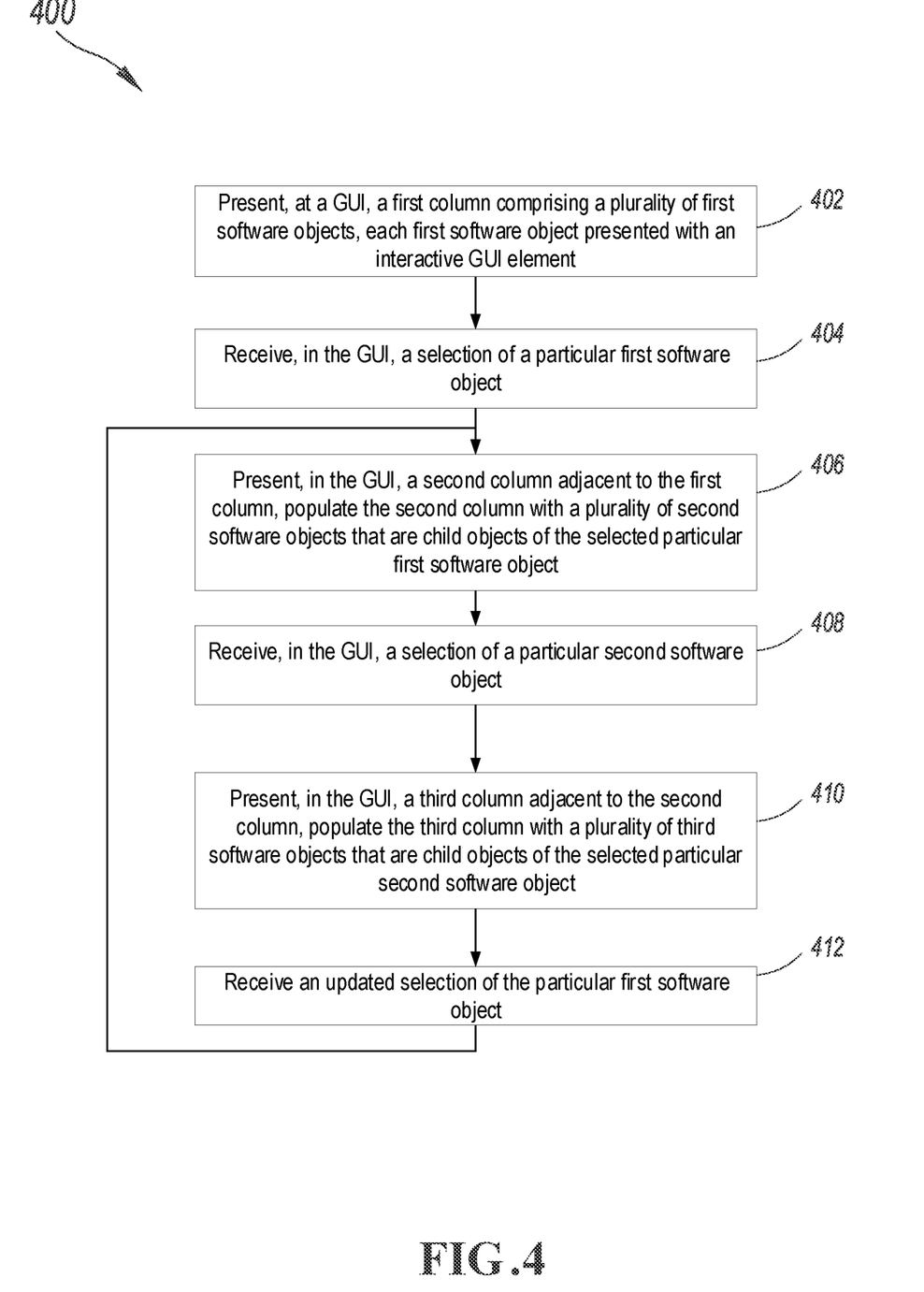
FIG. 4 is a flow chart illustrating an example process for displaying hierarchical software objects.

FIG. 4 depicts an example process 400 that can be executed in accordance with implementations of the present disclosure. In some implementations, the example process 400 may be performed using one or more computer-executable programs executed using one or more computing devices.

At 402, a GUI is presented to the user including a first column, and a plurality of first software objects in the first column. Each software object is presented with an interactive GUI element (e.g., standardized buttons, a dependency indicator etc.). In some implementations, additional columns are presented at this time. The additional columns can be presented as empty columns, or with unsorted or unfiltered software objects. In some implementations, the additional columns are presented with objects that have been determined to have a high likelihood of being selected in the future (e.g., commonly selected software objects or software objects that are likely to be selected based on the user's selection history).

At 404, a selection of a particular first software object is received in the GUI. In some implementations, the selection is made with a mouse click, finger tap on a touch screen, keyboard command, or other input to the GUI. The selected first software object can be highlighted, bolded or otherwise emphasized to indicate the selection has been made.

At 406, a second column is presented adjacent to the first column if it has not already been presented. The second column is populated with a plurality of second software objects that are child objects of the selected particular first software object. In some implementations, the only objects displayed in the second column are child objects of the selected particular first software objects. In some implementations, the second software objects are presented at the top of the second column, with additional objects that are not children of the selected particular first software object displayed below.

At 408, a selection of a particular second software object is received in the GUI. The selection of the particular second software object can be made in a similar fashion to the selection of the particular first software object.

At 410, a third column is presented adjacent to the second column if it has not already been presented. The third column is populated with a plurality of third software objects that are child objects of the selected particular second software object. In some implementations, the only objects displayed in the third column are child objects of the selected particular second software objects. In some implementations, the third software objects are presented at the top of the second column, with additional objects that are not children of the selected particular second software object displayed below. While FIG. 4 illustrates only three columns, additional columns, for deeper hierarchies are possible. For example, a selection in the third column can result in populating a fourth column, and a selection in a fourth column can result in populating a fifth column, and so on. In some implementations, the number of displayed columns does not limit the number of columns with selections. The number of displayed columns can be determined by available screen space, and columns can be rotated in and out of view (e.g., on a carousel) by the user in the GUI using gestures or other inputs (e.g., swipes, or selecting a button/icon in the GUI) so that a column that appeared on the left side of the display is rotated around so as to become a column on the right side of the display. Referring to FIG. 2, non visible column 210 would appear on the right side of the display where column 208 is shown. Columns 206 and 204 would shift one position to the left and column 202 would shift off of the display to become non visible. In, other implementations of the hierarchical display, the highest-ranked column does not rotate but remains fixed with respect to the other columns. Referring to FIG. 2 as an example, the highest-ranking column 210 is either not visible (e.g., it has been slid off of the left side of the display) or it is visible and is fixed in the position where column 202 is presently shown in FIG. 2. In such a case, column 202 visually appears to the right of now visible column 210 and columns 204 and 206 shift on the display to the right as well. Column 208 would shift off of the right side of the display and become not visible. By maintaining the relative positioning, the end user would have a visual representation of which columns are higher ranked (e.g., appearing towards the left side of the display) over those columns that are lower ranked (e.g. appearing towards the right side of the display). The previous description displays the hierarchy in a left-to-right fashion. In yet other implementations, columns generally displayed on the right side of the display would be higher ranking columns over those columns displayed on the left side of the display (e.g., a right-to-left hierarchy).

At 412, an updated selection of the particular first software object is received. For example, the user can go back and select a new object in the first column. In some implementations, instead of an updated selection of the first particular object, the second particular object (or third particular object) is selected, and the process proceeds accordingly. When an updated selection is made, the process 400 returns to 406 where the second column is re-populated according to the new selection.

Figure 5:
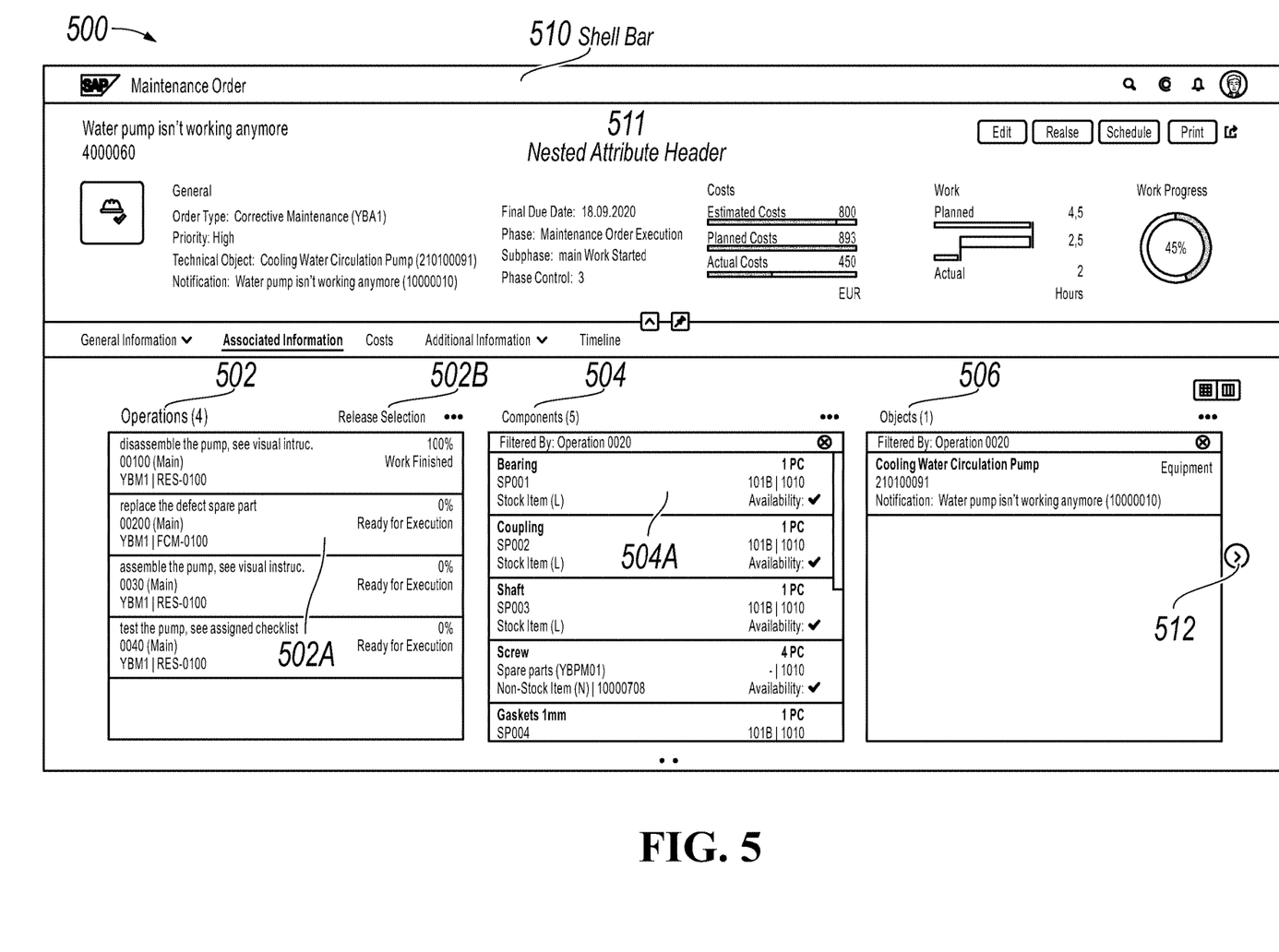
FIG. 5 is an example of an n-column explorer displaying objects with an associative relationship.

FIG. 5 is an example of an n-column explorer 500 displaying software objects with an associative relationship. The example implementation illustrated in FIG. 5 is for a maintenance order as shown in the title of the shell bar 510.

A nested attribute header 511 shows contextual information associated with the maintenance order. The information illustrated can be customized based on the presented or selected software objects, and can provide overview details related to the objects being traversed.

In the illustrated example, three columns are displayed: an operations column 502, a components column 504, and an objects column 506. Objects displayed in the columns can have associative relationships that are independent of any particular category. For example, components can be related to objects (e.g., a bearing can be associated with a cooling water pump) as well as operations (e.g., the bearing can also be associated with a test procedure or a maintenance operation). In another example, a car engine can be associated with multiple different car models and many different specific components, as well as different operational firmware associated with an engine control unit (ECU) of the engine. The associations between components of disparate categories can be displayed in the n-column explorer as shown in FIG. 5.

In the illustrated example, the user has selected the "replace the defect spare part" object 502A from the operations column 502. Upon selection, components column 504 is filtered, displaying only objects associated with the "replace the defect spare part" object 502A. For example, the filtered objects in column 504 include components, such as a "bearing" object 504A, a "coupling" object, a "shaft" object, and so on. Additionally, objects column 506 has been filtered, showing objects that are associated with the "replace the defect spare part" object 502A. In the illustrated example only "cooling water circulation pump" is shown; however, additional associated objects are possible and could be shown in other implementations, or where other objects have been selected. In some implementations, instead of filtering objects, associated objects are emphasized or highlighted, or otherwise sorted.

A release selection button 502B is provided, and can be used to de-select the selected object 502A. Selecting the release selection button 502B will remove the filters from columns 504 and 506, causing those columns to then display all objects in their respective categories. In some implementations, each object has an associated attribute which defines in which column or category the object should be displayed. The user can select an object in any column, and the remaining columns will filter or sort based on the selection. For example, if the user selects the bearing object 504A from the component column 504, columns 502 and 506 can be filtered or sorted showing or emphasizing objects associated with the bearing object 504A. In this example, operations column 502 can show a number of software objects related to operations for the bearing (e.g., grease, replace, test, disassemble, inspect, manufacture, etc.) while objects column 506 can show different objects in which the bearing 504A is installed (e.g., pumps, valves, reduction gears, etc.). This live updating of other columns allows the user to rapidly view related objects of varying categories with a single click.

GUI 500 also has a carousel button 512, which can show more columns of different categories (e.g., failures, shipping locations, suppliers etc.).

Figure 6:
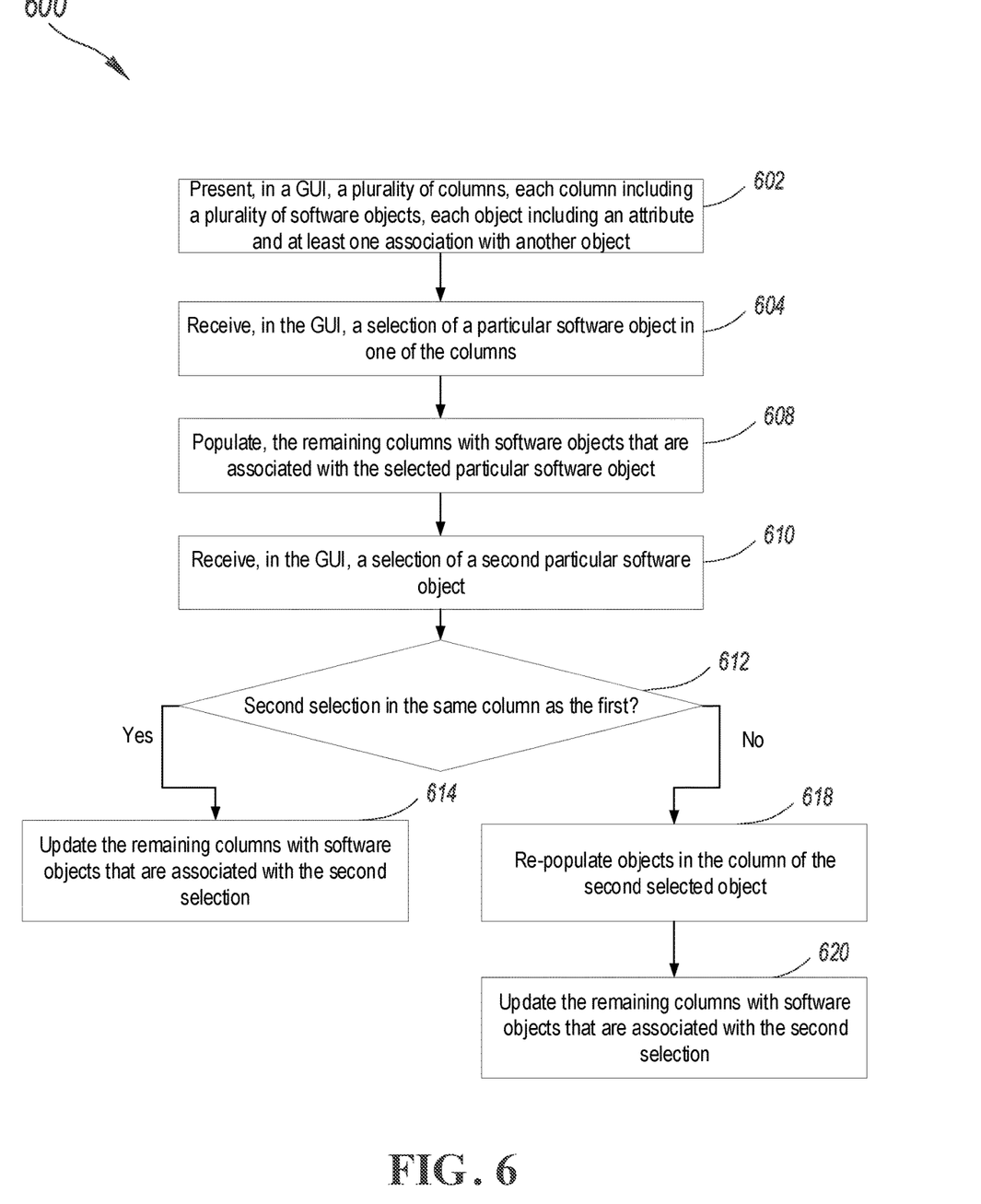
FIG. 6 is a flow chart illustrating an example process for displaying associative software objects.

FIG. 6 depicts an example process 600 that can be executed in accordance with implementations of the present disclosure. In some implementations, the example process 600 may be performed using one or more computer-executable programs executed using one or more computing devices.

At 602, a plurality of columns are presented in a GUI. Each column of the plurality of columns includes a plurality of software objects, each object having an attribute and one or more associations with another object. Each object's attribute can define which category/categories or column(s) to which the object is assigned. Associations with other objects can be dependencies or other suitable relationships that define the object. For example, a software object that is a multi-part component can be associated with each object that represents its parts.

At 604, a selection of a particular software object in one of the presented columns is received in the GUI. The selection can be a mouse click, tap, swipe, keyboard stroke or sequence of strokes, or other suitable input. Once selected, in some implementations, the GUI highlights or otherwise emphasizes the selected object in order to indicate that the selection has occurred.

At 608, at least one column other than the column in which the selection was made are populated with software objects that are associated with the selected particular software object. In some implementations, populating includes filtering objects that are currently displayed. In some implementations, the columns show only associated objects. In some implementations, the selected object is analyzed to determine any associated objects that are in different categories or columns and those associated objects are used to populate the at least one other column. In some implementations, the columns are sorted to present the associated objects at the top, with the remaining objects below. In some implementations, the associated objects are highlighted or emphasized without being moved in the column, and/or without other objects being moved or removed from the columns.

At 610, a selection of a second particular software object is received in the GUI. The selection can be received similarly to the selection received at 604.

At 612, once a selection of a second particular software object is received, a determination is made as to whether the second particular software object is in the same column as the originally selected particular software object.

If the second selection is in the same column as the originally selected particular software object, at 614, the remaining columns are updated with software objects associated with the second selection. This second selection effectively resets the n-column explorer, re-populating the columns based on the latest selection, independent of the original selection.

Returning to 612, if the second selection is in a different column than the first selection, at 618, the column that the second selected object is in (which was previously filtered based on the first selection) is re-populated. In some implementations, this re-population involves removing the filter from the previous selection, so the column displays its objects unfiltered, with the second selection emphasized.

At 620, the remaining columns that do not include the second selection are updated to display software objects associated with the second selection. This update can be similar to the populating performed at 608.

Figure 7:
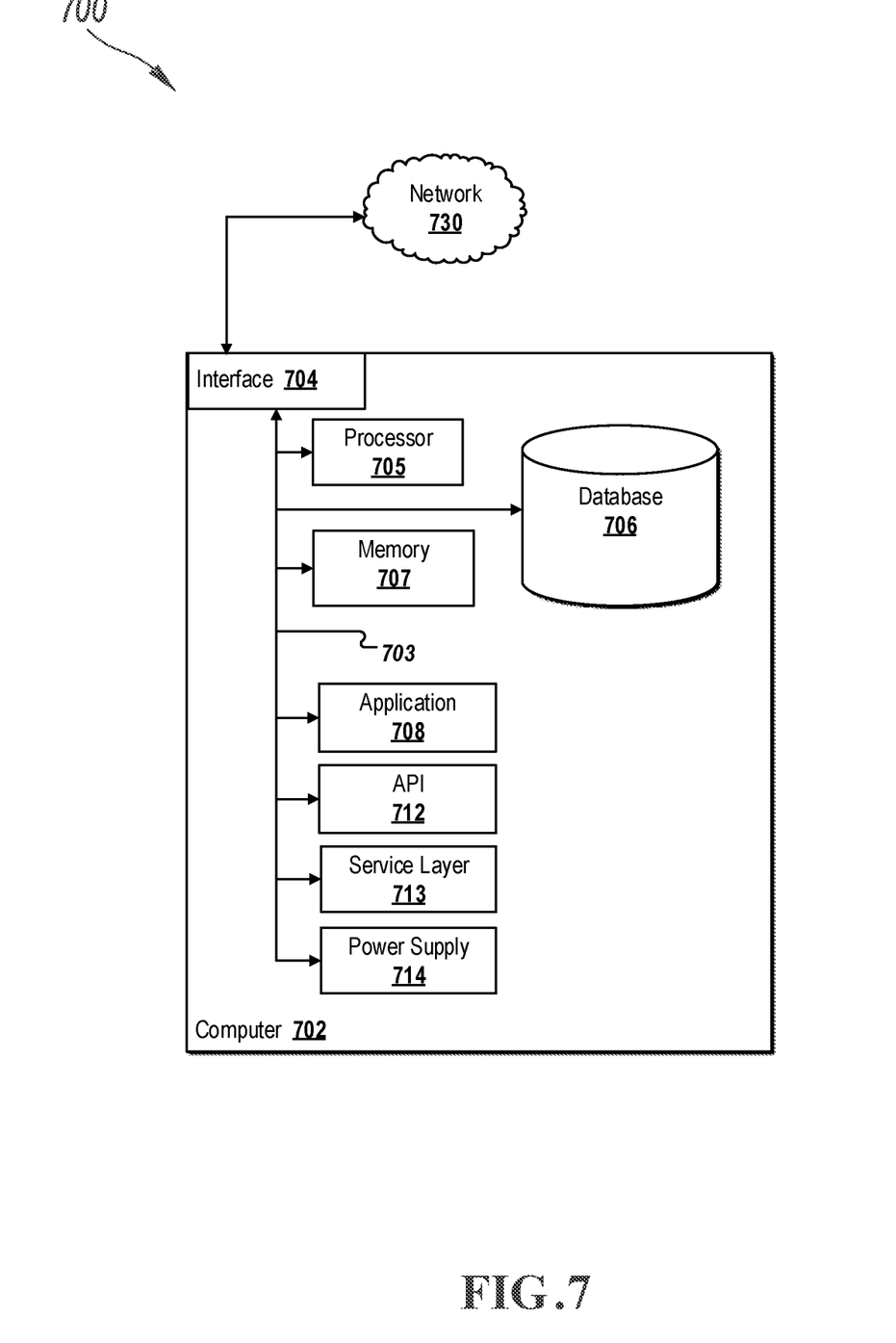
FIG. 7 is a block diagram illustrating an example of a computer-implemented system.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example, JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702. The Database 706 can hold any data type necessary for the described solution.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

The preceding figures and accompanying description illustrate example processes and computer-implementable techniques. However, the n-column explorer 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or perform additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A computer-implemented method for traversing hierarchical software objects comprising:
   identifying a plurality of first software objects and a plurality of second software objects, wherein each object of the plurality of second software objects are child objects of at least one object of the plurality of first software objects, and wherein at least one object of the plurality of second software objects is a child object of two or more objects of the plurality of the first software objects;
   presenting, in a graphical user interface (GUI), a plurality of columns comprising a first column comprising the plurality of first software objects to a user, each first software object presented in the GUI with an interactive GUI element, wherein the interactive GUI element comprises a number indicating the number of child software objects associated with the software object in which it is presented;
   presenting, in the GUI, a second column adjacent to the first column within the plurality of columns;
   receiving, in the GUI, a selection of a particular first software object; and
   in response to receiving the selection, populating, in the GUI, the second column with a subset of the plurality of second software objects distinct from the first software objects, the subset of the plurality of second software objects being child objects of the selected particular first software object and comprising the at least one object of the plurality of the second software objects that is a child object of two or more objects of the plurality of the first software objects.

2. The method of claim 1, wherein the interactive GUI element comprises an edit button, a bookmark button, and an unselect button.

3. The method of claim 1, comprising:
presenting a third column adjacent to the second column;
receiving a selection of a particular second software object; and
populating the third column with a plurality of third software objects distinct from the first and second software objects, the plurality of third software objects being child objects of the particular second software object, and each of the plurality of third software objects comprising the interactive GUI element.

4. The method of claim 1, comprising:
receiving, in the GUI, an updated selection of a particular first software object; and
updating, in the GUI, the second column to present a plurality of fourth software objects distinct from the updated selection of the particular first software object and the second plurality of software objects, the plurality of fourth software objects being child objects of the updated particular first software object.

5. The method of claim 1, comprising:
presenting a breadcrumb indicating all received selections.

6. The method of claim 1, wherein each of the second plurality of software objects is unique to each of the other second plurality of software objects.

7. The method of claim 1, wherein each object is associated with a priority which determines an order each object is presented in its respective column.

8. The method of claim 1, wherein the first column and the second column are columns in a plurality of columns, wherein the plurality of columns are arranged adjacent to each other, and wherein a number of columns displayed is based on available screen space.

9. The method of claim 1, wherein populating the second column comprises replacing an empty column with the second column comprising the second plurality of software objects.

10. The method of claim 1, wherein presenting the second column comprises filtering the plurality of second software objects previously displayed in the second column to present the subset of the second plurality of software objects.

11. The method of claim 1, comprising:
presenting, in the GUI, a carousel control GUI element, configured to, when selected:
reposition each column in the plurality of columns to an adjacent location;
remove one column from the GUI; and
add a new column to the GUI.

12. A non-transitory computer-readable storage medium coupled to one or more processors and having instructions stored thereon which, when executed by the one or more processors, cause the one or more processors to perform operations for traversing hierarchical software objects, the operations comprising:
identifying a plurality of first software objects and a plurality of second software objects, wherein each object of the plurality of second software objects are child objects of at least one object of the plurality of first software objects, and wherein at least one object of the plurality of second software objects is a child object of two or more objects of the plurality of the first software objects;
presenting, in a graphical user interface (GUI), a first column comprising the plurality of first software objects to a user, each first software object presented in the GUI with an interactive GUI element;
presenting, in the GUI, a second column adjacent to the first column;
receiving, in the GUI, a selection of a particular first software object;
in response to receiving the selection, populating, in the GUI, the second column with a subset of the plurality of second software objects distinct from the first software object wherein each of the second software objects is unique to each of the other second plurality of software objects, the subset of the plurality of second software objects being child objects of the selected particular first software object and comprising the at least one object of the plurality of the second software objects that is a child object of two or more objects of the plurality of the first software objects; and
presenting a third column adjacent to the second column;
receiving a selection of a particular second software object; and
populating the third column with a plurality of third software objects distinct from the first and second software objects, the third plurality of software objects being child objects of the particular second software object, and each of the plurality of third software objects comprising the interactive GUI element, and wherein at least one of the third software objects is also a child object to at least one non-selected second software object.

13. The non-transitory medium of claim 12, comprising:
receiving, in the GUI, an updated selection of a particular first software object; and
updating, in the GUI, the second column to present a plurality of fourth software objects distinct from the updated selection of the particular first software object and the second plurality of software objects, the plurality of fourth software objects being child objects of the updated particular first software object.

14. The non-transitory medium of claim 12, wherein the first column and the second column are columns in a plurality of columns, wherein the plurality of columns are arranged adjacent to each other, and wherein a number of columns displayed is based on available screen space.

15. A system, comprising:
one or more computers; and
a non-transitory, computer-readable storage device coupled to the one or more computers and having instructions stored thereon which, when executed by the one or more computer, cause the one or more computers to perform operations for traversing hierarchical software objects, the operations comprising:
identifying a plurality of first software objects and a plurality of second software objects, wherein each object of the plurality of second software objects are child objects of at least one object of the plurality of first software objects, and wherein at least one object of the plurality of second software objects is a child object of two or more objects of the plurality of the first software objects;
presenting, in a graphical user interface (GUI), a plurality of columns comprising a first column comprising the plurality of first software objects to a user, each first software object presented in the GUI with an interactive GUI element, wherein the interactive GUI element comprises a number indicating the number of child software objects associated with the software object in which it is presented;

presenting, in the GUI, a second column adjacent to the first column within the plurality of columns;

receiving, in the GUI, a selection of a particular first software object; and in response to receiving the selection, populating, in the GUI, the second column with a subset of the plurality of second software objects distinct from the first software object, the subset of the plurality of second software objects being child objects of the selected particular first software object and comprising the at least one object of the plurality of the second software objects that is a child object of two or more objects of the plurality of first software objects.

16. The system of claim 15, comprising:

presenting a third column adjacent to the second column;

receiving a selection of a particular second software object; and populating the third column with a plurality of third software objects distinct from the first and second software objects, the plurality of third software objects being child objects of the particular second software object, and each of the plurality of third software objects comprising the interactive GUI element.

17. The system of claim 15, comprising:

receiving, in the GUI, an updated selection of a particular first software object; and updating, in the GUI, the second column to present a plurality of fourth software objects distinct from the updated selection of the particular first software object and the second plurality of software objects, the plurality of fourth software objects being child objects of the updated particular first software object.

18. The system of claim 15, wherein each of the second plurality of software objects is unique to each of the other second plurality of software objects.

19. The system of claim 15, the operations comprising:

presenting, in the GUI, a carousel control GUI element, configured to, when selected:

reposition each column in the plurality of columns to an adjacent location;

remove one column from the GUI; and add a new column to the GUI.

* * * * *